United States Patent [19]

Margolis

[11] 4,332,441
[45] Jun. 1, 1982

[54] COHERENTLY PULSED LASER SOURCE

[76] Inventor: Robert A. Frosch, Administrator of the National Aeronautics and Space Administration, with respect to an invention of Jack S. Margolis, Pasadena, Calif.

[21] Appl. No.: 150,040

[22] Filed: May 15, 1980

[51] Int. Cl.³ .............................................. G02F 1/32
[52] U.S. Cl. .................................................. 350/358
[58] Field of Search ..................... 350/358, 169, 96.13, 350/96.14, 358; 333/30 R, 72

[56] References Cited

U.S. PATENT DOCUMENTS 3,566,303  2/1971  DeMaria ............................ 350/358
4,124,280  11/1978  Berg et al. .......................... 350/358

*Primary Examiner*—William L. Sikes
*Attorney, Agent, or Firm*—Paul F. McCaul; John R. Manning

[57] ABSTRACT

An electronically controllable apparatus is described which modulates a continuous wave laser beam 22 so as to produce an output beam 42 consisting of coherent "pulses" that are electronically controllable as to both pulse repetition rate and pulse width. The apparatus includes two acoustic devices 24, 26 positioned so that the laser beam passes through them in sequence, and apparatus 32 or 34 for passing sound waves through the devices to frequency shift the laser radiation as well as to diffract it. Each acoustic device such as 24 generates sound waves containing a group of frequencies which result in spaced pulses. The spreading of a laser beam at 40 which emanates from the first acoustic device 24 is countered by the second acoustic device 26 to produce a collimated, coherently pulsed, laser beam 42.

7 Claims, 7 Drawing Figures

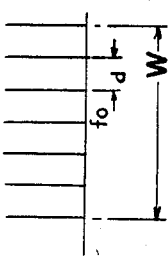
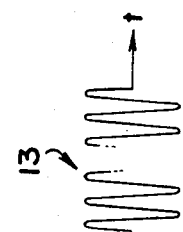
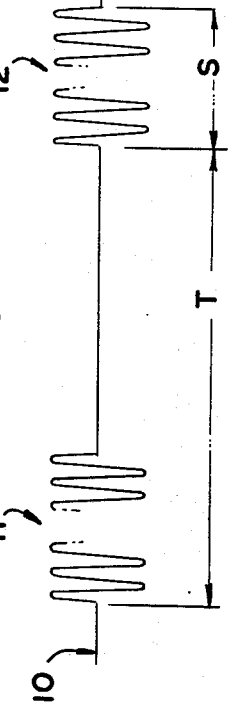
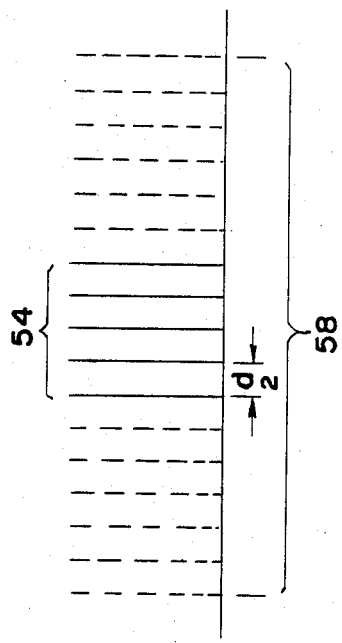
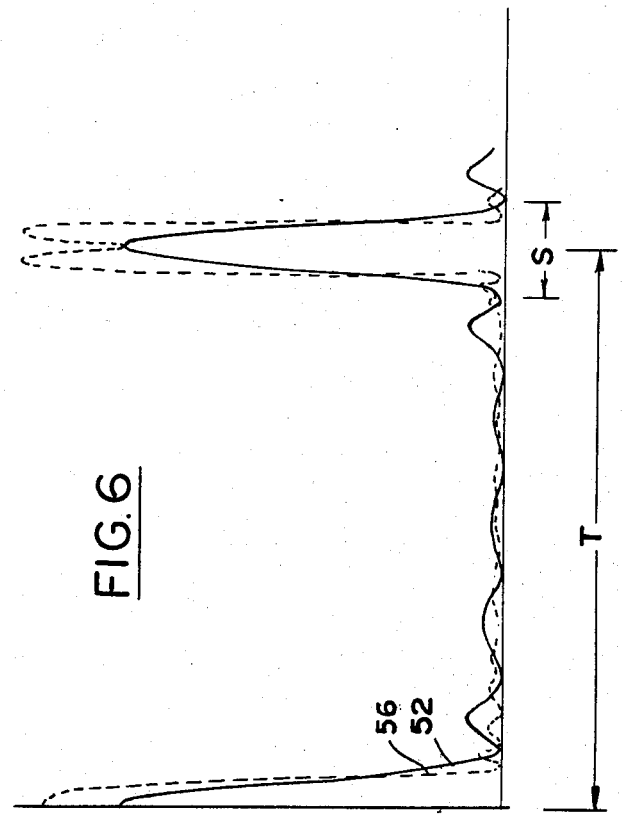

COHERENTLY PULSED LASER SOURCE

DESCRIPTION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

TECHNICAL FIELD

This invention relates to the production of pulses of coherent optical radiation by the use of sound in optoacoustic devices to modulate a continuous laser beam.

BACKGROUND ART

There are many applications where coherent pulses from a laser are required, which can be varied in width and/or repetition rate. For example, coherent laser pulses are useful in optical communications, Lidar (laser radar), optical gyroscopes, and physics instruments. One way for producing such pulses is by mode locking lasers, but the mode locking parameters are not easily changed to control repetition rate or pulse duration. Another technique is the use of a continuous wave laser and a pulsed amplifier, but this has the complication of requiring two lasers. An even simpler apparatus for producing coherent pulses from a single laser, would be of considerable value.

STATEMENT OF THE INVENTION

In accordance with one embodiment of the present invention, an apparatus of relatively simple design is provided for generating a coherently pulsed laser beam which can be electronically controlled. The apparatus includes a continuous wave laser, a pair of diffraction bodies which are located so the laser beam passes through them sequentially, and transducers coupled to the diffraction bodies to pass sound waves through them. The sound waves passing through each diffraction body are the sum of a series of monochromatic waves. Each monochromatic acoustic wave separately diffracts and frequency translates the optical laser beam. The spreading of the laser beam emanating from the first diffraction body, is counteracted by the second diffraction body and transducer, to produce a substantially collimated pulsed laser beam.

BRIEF DESCRIPTION OF THE DRAWINGS

FIG. 4 is a waveform showing an idealized graph having the waveform of a coherently pulsed laser beam.

FIG. 5 is a graph indicating the truncated frequency spectrum of the beam of FIG. 4 (the relative intensities are not intended to be shown).

FIG. 6 shows graphs of the envelopes of coherently pulsed laser beams produced with the apparatus of the present invention using a finite number of acoustic frequencies.

FIG. 7 is a graph showing the frequency spectrum of the acoustic waves utilized in the production of the waveform envelopes shown in FIG. 6 (the relative intensities are not intended to be shown).

BEST MODE FOR CARRYING OUT THE INVENTION

FIG. 4 shows a waveform 10 which represents an idealized coherently pulsed laser beam. The beam consists of optical radiation, that is radiation in the infrared, visible or ultraviolet wavelengths or somewhat beyond, with the beam being in the form of trains 11-13 of substantially sinusoidal waves of optical frequency which are separated by quiescent periods, each train having a duration S and with the beginning of the trains spaced apart by a time T. The frequency spectrum of the wave 10 is shown in FIG. 5, which shows that it can be considered to consist of numerous components, each of a particular single frequency, separated from one another by a constant frequency difference d, and with a center frequency of $f_o$ representing the frequency of the sinusoidal continuous wave which would result if each train in FIG. 4 were continued indefinitely. It may be noted that the components in FIG. 5 have different amplitudes, but FIG. 5 only shows their frequencies. The frequency spacing d between the components in FIG. 5 determines the repetition rate of the pulses in the time domain, while the width of the pulses is, in a simplistic sense, determined by the width W of the spectrum. The exact shape of the pulses in the time domain shown in FIG. 4, is controlled by the variation in strength of the components in the frequency spectrum of FIG. 5. These functions are determined by taking the appropriate fourier transforms of the desired waveform.

Figure 1:
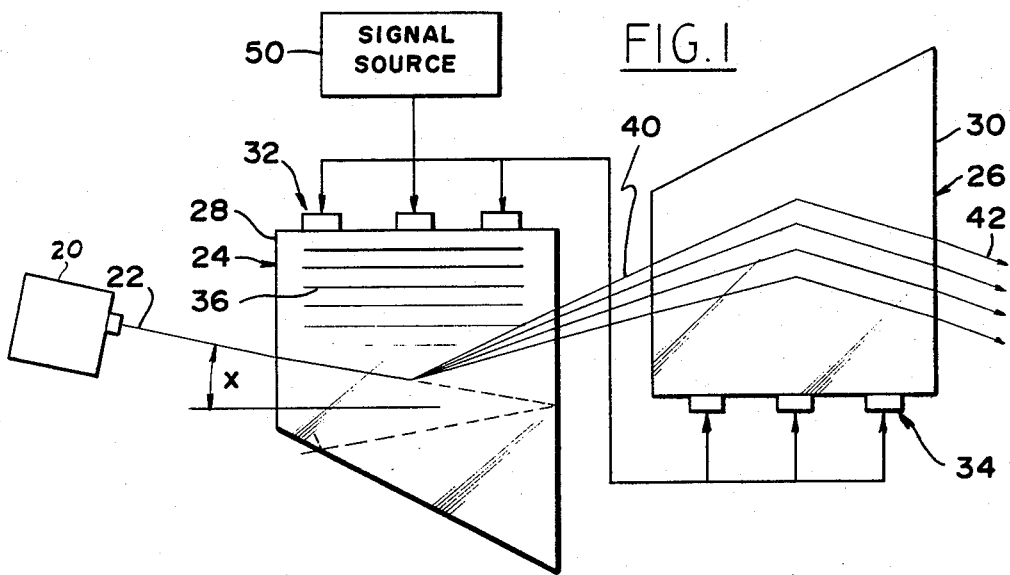
FIG. 1 is a simplified side elevation view of a coherently pulsed laser source constructed in accordance with one embodiment of the present invention.
Figure 2:
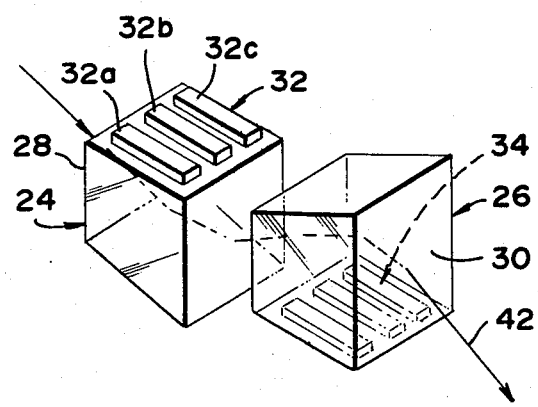
FIG. 2 is a partial perspective view of the apparatus of FIG. 1.

FIG. 1 shows apparatus of the present invention which can be utilized to generate pulsed coherent radiation such as of the type shown in FIG. 4, using a single laser 20 which produces a continuous wave laser beam 22. (The term "laser" herein refers to any device which produces coherent optical radiation, regardless of the technique). The apparatus also includes a pair of diffraction devices 24, 26 which include optical elements 28, 30 of material which is transparent to the passage of optical radiation from the laser, and sonic transducers 32, 34 coupled to the optical elements. The sound travels in a direction which is primarily perpendicular to the laser beam. This type of diffraction device, which is known, diffracts a laser beam passing through a crystal, by the use of travelling acoustic waves. The angle X of the beam relative to the sonic wavefront must be at the Bragg angle which is a small angle such as less than a few degrees, to obtain such diffraction. (This is described in Introduction to Optical Electronics by Amnon Yariv, published by Holt, Rienhart, Winston, 1971, p. 308-310). Such devices have been used with single acoustic frequencies to shift the frequency of the laser beam, modulate it, or deflect it. The acoustic wave fronts, indicated at 36, produce travelling localized variations in density of the optical material, to diffract the beam through a generally small angle as though diffracted by a grating. However, because the acoustic wave is travelling, the laser beam is Doppler shifted by a frequency equal to the acoustic wave frequency. If several acoustic frequencies are introduced, the incident laser beam will be diffracted in several slightly different directions, and also Doppler shifted by several different corresponding frequencies. The frequency shifts of the laser radiation are equal to the injected acoustic frequencies. The Bragg diffraction angle is given by the relationship $\lambda = 2d \cos X$, where $\lambda$ = wavelength of laser radiation in the diffracting medium, d = acoustic wavelength in the medium, and X = Bragg diffraction angle. The divergent beam 40 which is shown leaving the first diffraction device 24 is collimated by the second diffraction device 26, so that the different components of the optical radiation overlap in order to recombine into the desired coherent pulses.

The second diffraction device 26 is operated so that the transducer 34 transmits the same sonic frequencies through the second optical element 30 as is passed through the first one 28. However, the second diffraction device is oriented oppositely to the first one 24. As a result, the divergent beam components are again diverted, but in a manner so that they emerge as a beam 42 that is collimated and therefore that can be utilized in most applications requiring a coherently pulsed laser beam. It may be noted that the final beam 42 is wider than the initial beam 22 from the laser. However, if the two diffraction devices 24, 26 are close to each other and the angle of diffraction is small (as can always be arranged by a proper choice of frequency for the acoustic waves), the spatial separation of the beam components is small and the overlap region is large. The non-overlapping regions of the beam can be so small as to be negligible, or can be blocked out.

The transducers 32, 34 of the diffraction devices, can be driven by a signal source 50 which produces a spectrum of acoustic waves which are chosen to produce a series of monochromatic waves of a frequency spacing and amplitude to produce an optical pulse shape having the desired envelope. FIG. 6 shows the envelope 52 of the spectrum of a resultant coherently pulsed laser source which results from the application of five components as indicated by the components 54 in FIG. 7. The sonic components 54 are separated from one another by a frequency d/2 which is one-half the frequency separation d shown in FIG. 5. The use of one-half the frequency separation is due to the fact that two diffraction devices are utilized. The acoustic frequencies producing the envelope 52 of FIG. 6, are chosen so that the spacing T between pulses is 10 times the width S of each pulse. In one example of a typical application, the width S of each pulse may be chosen to equal that of a sine wave of $10^4$ Hz frequency, while the frequency of the laser beam may be $10^{14}$ Hz, so that a large number of wavelengths of the laser beam are contained in each pulse, and only the envelope is shown at 52. In FIG. 6, another envelope 56 is shown which represents the sum of a group 58 (FIG. 7) of seventeen frequency components which are all spaced apart by the distance d/2. It may be noted that in FIG. 7, only the frequencies of the components are given, and not their relative amplitudes.

Figure 3:
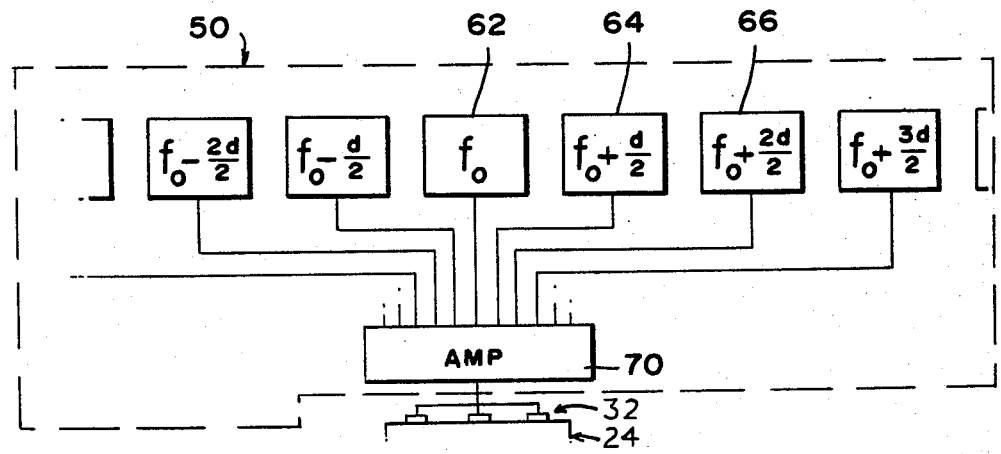
FIG. 3 is a diagrammatic view of a portion of the apparatus of FIG. 1.

FIG. 3 shows how the source 50 can be constructed, by adding together the outputs of a group of signal generators 62, 64, 66 etc. which each produce a fundamental frequency $f_o$ plus or minus an integral number times a difference frequency d/2. The sum of the signal generators is added and amplified in an amplifier 70 and delivered to the transducers such as 32 of a diffraction device. Of course a separate circuit can be used to drive each transducer. Each transducer 32 may include several transducer elements 32a, 32b, 32c located on one surface of the optical element, so as to produce a substantially planar wavefront instead of a curved one. In actual practice, all of the acoustic frequencies may be produced by a frequency synthesizer which utilizes a single crystal controlled oscillator to produce the fundamental frequency, so as to produce a set of coherent waves.

Thus, the invention provides an apparatus for generating a coherently pulsed laser beam, utilizing a single continuous wave laser source and an acousto-optic modulator. The acousto-optic modulator includes a pair of diffraction devices which each include an element formed of a medium which is transparent to the passage of optical radiation, and a transducer coupled to the medium to pass sound waves therethrough. A signal source which drives the transducers can produce a group of signals whose sum is substantially a series of pulses, to pulse the laser beam. The diffraction devices are positioned so that the laser beam passes in sequence through them. The divergent laser beam components generated by the first diffraction device are therefore collimated by the second diffraction device, to produce a collimated coherently pulsed laser beam.

We claim:

1. Apparatus for generating modulated optical radiation comprising:
    a source of continuous coherent optical radiation;
    first and second diffraction devices, each device including an optical element which is transparent to the passage of optical radiation from said source, and each device also including a sound transducer coupled to the optical element to pass sound waves therethrough; and
    a signal source which generates signals of a plurality of frequencies, said signal source coupled to said transducers to energize each of them with the same signals;
    said source and diffraction devices positioned so that radiation from said source passes into said first device and the radiation emanating from said first device passes into said second device.

2. The apparatus described in claim 1 wherein: said signal source is constructed to generate a signal containing a predetermined frequency, a plurality of additional frequencies which are higher than said predetermined frequency, and a plurality of frequencies which are lower than said predetermined frequency, with each pair of adjacent frequencies being separated by a predetermined constant frequency difference, and with the signal of each frequency having a bandwidth which is much less than one-tenth the constant frequency difference.

3. Apparatus for generating pulses of optical radiation from a continuous coherent beam of radiation, comprising:
    an optical element of substantially uniform index of refraction positioned to intercept said beam of radiation;
    an electrical-to-sound transducer coupled to said optical element to pass sound waves therethrough in a direction which is primarily perpendicular to the beam of radiation; and
    driver means coupled to said transducer for delivering electrical signals thereto which contain frequencies whose sum defines time-spaced pulses.

4. The apparatus described in claim 3 including:
    a second optical element positioned to intercept the beam emerging from said first named element; and
    a second transducer coupled to said optical element to pass sound waves therethrough and coupled to said driver means to receive signals therefrom.

5. The apparatus described in claim 4 including:

a source of optical radiation positioned to pass through said first optical element at an angle to the direction of sound waves passing therethrough;

said second optical element and the transducer device coupled thereto being positioned so the sound waves therein move in a direction substantially opposite to the direction of sound waves in said first optical element.

6. A method for generating pulses of optical radiation, comprising:

directing a beam of continuous optical radiation through an optical element which is transparent to the passage of the radiation; and passing acoustic waves through said optical element in a direction primarily perpendicular to the beam of optical radiation to frequency shift the optical radiation, with the acoustic waves chosen so their sum has an envelope that forms pulses.

7. The method described in claim 6 including:

passing the beam of optical radiation which emerges from said optical element through a second optical element and passing second acoustic waves through said second optical element wherein the sum of said second acoustic waves has an envelope that forms pulses.

* * * * *